United States Patent [19]

Chan

[11] 4,096,167
[45] Jun. 20, 1978

[54] FUNGICIDAL AND HERBICIDAL ALPHA-HALOACETANILIDES

[75] Inventor: David Cheong King Chan, Petaluma, Calif.

[73] Assignee: Chevron Research Company, San Francisco, Calif.

[21] Appl. No.: 769,645

[22] Filed: Feb. 17, 1977

Related U.S. Application Data

[63] Continuation-in-part of Ser. No. 641,839, Dec. 18, 1975, abandoned, which is a continuation-in-part of Ser. No. 400,287, Sep. 24, 1973, which is a continuation-in-part of Ser. No. 515,781, Oct. 17, 1974, Pat. No. 3,944,607, which is a continuation-in-part of Ser. No. 541,814, Jan. 17, 1975, abandoned.

[51] Int. Cl.² ............... C07C 153/09; A01N 9/12
[52] U.S. Cl. ..................... 260/455 R; 71/100
[58] Field of Search ............... 260/455 R; 71/100

[56] References Cited

U.S. PATENT DOCUMENTS

| | | | |
|---|---|---|---|
| 3,766,244 | 10/1973 | Giacobbe et al. | 260/455 R |
| 3,784,635 | 1/1974 | Theissen | 260/471 R |
| 3,830,829 | 8/1974 | Olin | 260/455 R |
| 3,832,383 | 8/1974 | Olin | 260/455 R |

FOREIGN PATENT DOCUMENTS 796,263  10/1972  Belgium ................. 260/455 R

Primary Examiner—Joseph Paul Brust
Assistant Examiner—Robert C. Whittenbaugh
Attorney, Agent, or Firm—Dix A. Newell; T. G. DeJonghe; Raymond Owyang

[57] ABSTRACT

Fungicidal and herbicidal alpha-haloacetanilides of the formula:

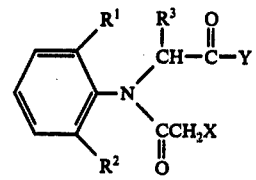

wherein $R^1$ is alkyl, $R^2$ is hydrogen or alkyl; $R^3$ is hydrogen or alkyl; X is halo; and Y is —$SR^4$ or —$NR^5R^6$ wherein $R^4$ is alkyl, alkenyl or phenylalkyl, $R^5$ is hydrogen, alkyl, alkenyl or alkynyl and $R^6$ is hydrogen, alkyl, alkenyl or alkynyl, with the proviso that $R^5$ and $R^6$ may be joined to form a divalent alkylene group or —$CH_2CH_2OCH_2CH_2$—, are prepared from N-phenylamino thioacetates.

7 Claims, No Drawings

FUNGICIDAL AND HERBICIDAL ALPHA-HALOACETANILIDES

CROSS-REFERENCE TO RELATED APPLICATIONS

This application is a continuation-in-part of U.S. application Ser. No. 641,839, filed Dec. 18, 1975, now abandoned which in turn is a continuation-in-part of U.S. applications Ser. No. 400,287, filed Sep. 24, 1973; Ser. No. 515,781, filed Oct. 17, 1974, now U.S. Pat. No. 3,944,607; and Ser. No. 541,814, filed Jan. 17, 1975, now abandoned.

DESCRIPTION OF THE PRIOR ART

U.S. Pat. No. 3,780,090 of Akiba et. al. and Belgian Pat. No. 796,263 of Hercules disclose the use of alkyl alpha-(N-haloacetyl-N-2,6-dialkylphenylamino)-alkanoate esters as herbicides. German Offen. No. 2,350,944 of Ciba Geigy discloses alpha-N-haloacetyl-N-2,6-dialkylphenylamino)alkanoate esters as antifungal agents. Belgian Pat. No. 813,469 of Ciba Geigy discloses the use of phenylamine acetamides as herbicides.

DESCRIPTION OF THE INVENTION

The alpha-haloacetanilides of the invention are represented by the formula (I):

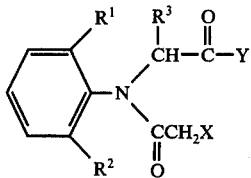

wherein $R^1$ is lower alkyl of 1 to 6 carbon atoms; $R^2$ is hydrogen or lower alkyl of 1 to 6 carbon atoms; $R^3$ is hydrogen or lower alkyl of 1 to 6 carbon atoms; X is fluorine, chlorine, bromine or iodine; and Y is $-SR^4$ or $-NR^5R^6$ wherein $R^4$ is lower alkyl of 1 to 6 carbon atoms, lower alkenyl of 3 to 6 carbon atoms or phenylalkyl of 7 to 10 carbon atoms substituted on the phenyl ring with up to 2 (0 to 2) fluoro, chloro, bromo or alkyl of 1 to 2 carbon atoms, $R^5$ is hydrogen, lower alkyl of 1 to 6 carbon atoms, lower alkenyl of 3 to 6 carbon atoms or lower alkynyl of 3 to 6 carbon atoms, and $R^6$ is hydrogen, lower alkyl of 1 to 6 carbon atoms, lower alkenyl of 3 to 6 carbon atoms or lower alkynyl of 3 to 6 carbon atoms, with the proviso that $R^5$ and $R^6$ may together form a divalent alkylene group of 4 to 6 carbon atoms or an ethyleneoxyethylene group ($-CH_2CH_2OCH_2CH_2-$).

Representative alkyl groups which $R^1$, $R^2$, $R^3$, $R^4$, $R^5$ and $R^6$ may represent include methyl, ethyl, propyl, isopropyl, butyl, sec-butyl, t-butyl, pentyl, isohexyl, hexyl, etc. Preferred alkyl groups are those having 1 to 3 carbon atoms, especially methyl or ethyl.

Representative alkenyl groups which $R^4$, $R^5$ and $R^6$ may represent include allyl, 2-butenyl, 3-pentenyl, etc.

Representative alkynyl groups which $R^5$ and $R^6$ may represent include propargyl, 2-butynyl, 3-pentynyl, etc.

Representative divalent alkylene groups formed by joining $R^5$ and $R^6$ include tetramethylene, pentamethylene and 3-methylpentamethylene.

Representative phenylalkyl $R^4$ groups include benzyl, 2-fluorobenzyl, 3,4-dichlorobenzyl, 4-bromobenzyl, 2-phenylethyl, 3-(p-chlorophenyl)propyl, 4-methylbenzyl and 3-(p-tolyl)propyl. Preferred phenylalkyl $R^4$ groups are phenylalkyl of 7 to 10 carbon atoms substituted on the phenyl ring with up to 2 fluoro, chloro or bromo.

Preferably $R^1$ and $R^2$ are alkyl of 1 to 3 carbon atoms, $R^3$ is hydrogen, $R^4$ is alkyl of 1 to 6 carbon atoms, more preferably of 1 to 3 carbon atoms, $R^5$ is hydrogen or alkyl of 1 to 3 carbon atoms and $R^6$ is alkyl of 1 to 3 carbon atoms.

Representative N-carbamylalkyl-substituted compounds of the invention (Y is $-NR^5R^6$) are:

N-(carbamylethyl)-2,6-dimethyl-alpha-chloroacetanilide,

N-(N'-methylcarbamylethyl)-2,6-dimethyl-alpha-chloroacetanilide,

N-(N'-methylcarbamylmethyl)-2,6-diethyl-alpha-chloroacetanilide,

N-(N',N'-diethylcarbamylmethyl)-2,6-dimethyl-alpha-chloroacetanilide,

N-(N'-propargylcarbamylmethyl)-2,6-diisopropyl-alpha-bromoacetanilide,

N-(N'-3-hexynylcarbamylmethyl)-2,6-dimethyl-alpha-fluoroacetanilide,

N-(N'-allyl-N'-methylcarbamylmethyl)-2,6-dimethyl-alpha-bromoacetanilide,

N-(N'-allylcarbamylmethyl)-2,6-dimethyl-alpha-iodoacetanilide,

N-(piperidinocarbonylmethyl)-2-methyl-6-ethyl-alpha-chloroacetanilide, and

N-(morpholinocarbonylmethyl)-2,6-dimethyl-alpha-haloacetanilide.

Representative thioate ester-substituted compounds of the invention (Y is $-SR^4$) include:

methyl alpha-(N-fluoroacetyl-N-2,6-dimethylphenylamino)thioacetate, ethyl alpha-(N-chloroacetyl-N-2,6-diisopropylphenylamino)thioacetate, allyl alpha-(N-iodoacetyl-N-2-butylphenylamino)thioacetate, benzyl alpha-(N-chloroacetyl-N-2,6-dimethylphenylamino)thiopropionate, methyl alpha-(N-bromoacetyl-N-2,6-dimethylphenylamino)thiopropionate, and p-bromobenzyl alpha-(N-iodoacetyl-N-2-methyl-6-ethylphenylamino)thiopropionate.

The thioate ester compounds of the invention wherein Y is $-SR^4$ may be prepared by alkylating an aniline compound (II) with an alpha-halothioate ester (III) to produce an alpha-(N-phenylamino)thioate ester (IV) and subsequently acylating the thioate ester (IV) with an alpha-haloacetyl halide (V) to give the alpha-(N-haloacetyl-N-phenylamino)thioate ester (VI). This sequence of reactions is depicted by the following equations:

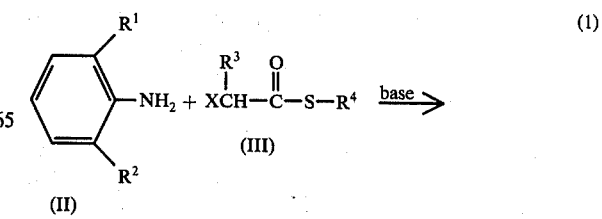

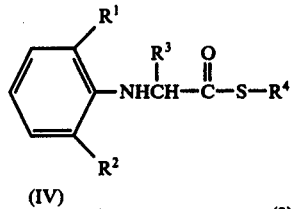

(IV)

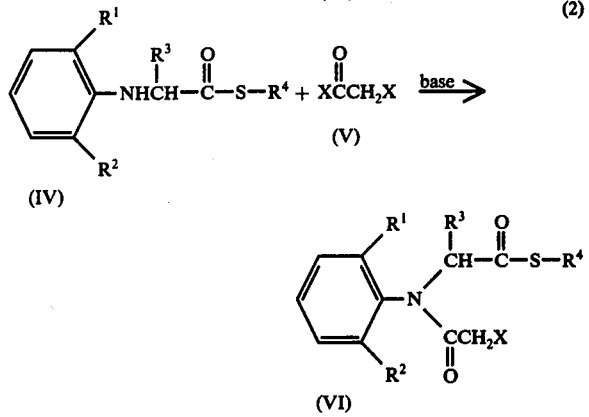

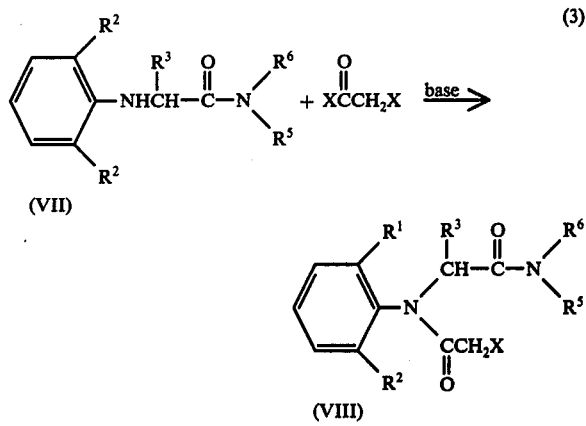

wherein $R^1$, $R^2$, $R^3$, $R^4$ and X have the same significance as previously defined.

The N-carbamylalkyl-substituted compounds of the invention wherein Y is $-NR^5R^6$ may be prepared by acylating an N-(carbamylalkyl)aniline (VII) with an alpha-haloacetyl halide (V) to give the N-carbamylalkyl-alpha-haloacetanilide product (VIII). This reaction is depicted by the following equation:

wherein $R^1$, $R^2$, $R^3$, $R^5$, $R^6$ and X have the same significance as previously defined.

The alkylation reaction (1) is preferably conducted in the presence of an acid acceptor. Suitable acid acceptors are inorganic alkali metal carbonates such as sodium carbonate or potassium carbonate. Generally, substantially equimolar amounts of reactants (II) and (III) and the acid acceptor are employed. The reaction is conducted in inert polar inorganic solvents, e.g., apolar diprotic solvents such as dimethylformamide and acetonitrile, at reaction temperatures varying from 0° to 90° C, preferably from 20° to 50° C. The reaction pressure may be atmospheric, subatmospheric or superatmospheric. However, for convenience of conducting the reaction, the pressure is generally atmospheric. The reaction time will, of course, vary depending upon the reactants and the reaction temperature. Generally the reaction time is from 0.25 to 24 hours. The product (IV) is generally purified by conventional procedures, e.g., extraction, distillation or crystallization, before use in the acylation reaction (2).

The acylation reaction (2) is conducted by conventional procedures, preferably in the presence of an acid acceptor such as a trialkyl amine or pyridine. The reactants (IV) and (V) and the acid acceptor are generally contacted in substantially equimolar amounts in the liquid phase in an inert organic solvent at a temperature of 0° to 100° C. Suitable inert organic solvents include ethyl acetate, methylene dichloride, dimethoxyethane, benzene, etc. The product is isolated and purified by conventional procedures such as extraction, distillation, chromatography, crystallization, etc.

The acylation reaction (3) is conducted by a procedure essentially identical to that described for reaction (2).

The N-(carbamylalkyl)aniline intermediate (VII) employed in reaction (3) may be prepared by reacting the alpha-(N-phenylamino)thioate ester (IV) with an amine in the liquid phase, as depicted by the following reaction (4):

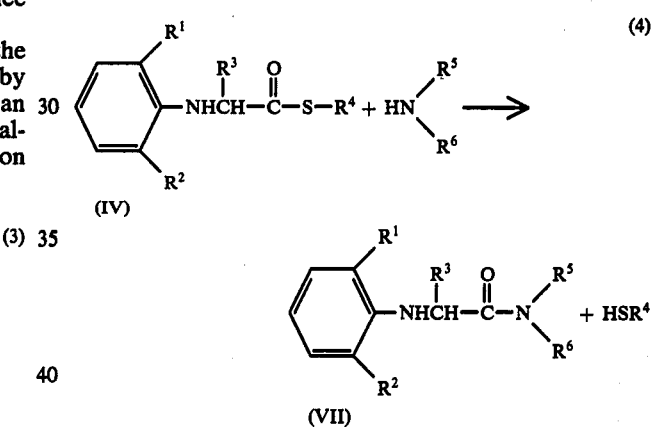

In reaction (4) the thioate ester (IV) is preferably a thioalkanoate ester, i.e., $R^4$ is alkyl, especially alkyl of 1 to 3 carbon atoms. Reaction (4) is preferably conducted in an inert liquid diluent. Suitable diluents include water, organic solvents, e.g., apolar diprotic solvents such as dimethylformamide and acetonitrile, and mixtures of water and organic solvents. Generally, substantially equimolar amounts of the thioester (IV) and the amine are employed, although an excess of the amine may be employed. The reaction temperatures vary from 0° to 100° C and the reaction pressure may be atmospheric, subatmospheric or superatmospheric. The reaction time will, of course, vary depending upon the reactants and the reaction temperature. Generally, the reaction time is 0.25 to 24 hours. To decrease the reaction time, the reaction may be conducted in the presence of an organic base such as a pyridine compound or a trialkylamine. Suitable pyridine compounds include pyridine, alpha-picoline, 3,5-dimethylpyridine, etc., and suitable trialkylamines include trimethylamine, tributylamine, etc. When a base is employed, amounts of base from about 0.01 to 1 mol per mol of thioate ester are generally satisfactory.

EXAMPLES

The preparation of the compounds of the invention by the above reactions is illustrated by the following examples.

EXAMPLE 1

Preparation of isopropyl alpha-(N-2,6-dimethylphenylamino)thioate

Isopropyl mercaptan (7.6 g, 0.1 mol) was added dropwise to a stirred and cooled (ice bath) solution of 20.2 g (0.1 mol) bromoacetyl bromide in 250 ml methylene chloride. The reaction was allowed to warm to about 25° C and stirred for 48 hours. Nitrogen gas was then bubbled into the reaction mixture to remove dissolved hydrogen bromide. The reaction mixture was evaporated under reduced pressure to give 21 g of crude isopropyl alpha-bromothioacetate (contaminated by a little $CH_2Cl_2$).

A slurry of 10.6 g (0.05 mol) isopropyl alpha-bromothioacetate (prepared above), 6.1 g (0.05 mol) 2,6-dimethylaniline, and 5.3 g (0.05 mol) sodium carbonate in 150 ml dimethylformamide was stirred at 25° C for 24 hours. The benzene extracts were washed with water, dried over magnesium sulfate and evaporated under reduced pressure to give an oil. The oil was chromatographed on 200 g silica gel. Isopropyl alpha-(N-2,6-dimethylphenylamino)thioacetate (9 g) was eluted from the silica gel with 97.5/2.5 hexane/ether.

EXAMPLE 2

Preparation of ethyl alpha-(N-2-methyl-6-ethylphenylamino)thioacetate

A slurry of 24.2 g (0.2 mol) ethyl alpha-bromothioacetate, 36.8 g (0.2 mol) 2-methyl-6-ethylaniline and 2.2 g (0.2 mol) sodium carbonate in 200 ml dimethylformamide was stirred at 25° C for 5 days. The reaction mixture was diluted with about 25 ml water and extracted with benzene. The benzene extracts were washed with water, dried over magnesium sulfate and evaporated under reduced pressure to give 48.2 g of ethyl alpha-(N-2-methyl-6-ethylphenylamino)thioacetate.

EXAMPLE 3

Preparation of N-(N'-propargylcarbamylmethyl)-2-methyl-6-ethyl-alpha-chloroacetanilide A solution of 24.2 g (0.096 mol) ethyl alpha-(N-2-methyl-6-ethylphenylamino)thioacetate, 5.5 g (0.1 mol) propargylamine and 0.5 g pyridine in 250 ml acetonitrile was stirred at 25° C for about 16 hours. The reaction mixture was then evaporated under reduced pressure and the residue was chromatographed on 250 g silica gel (50% ether/hexane eluent) to give 15.8 g of N-(N'-propargylcarbamylmethyl)-2-methyl-6-ethylaniline.

A sample of 2.5 g (0.022 mol) chloroacetyl chloride was added dropwise to a solution of 5 g (0.22 mol) N-(N'-propargylcarbamylmethyl)-2-methyl-6-ethylaniline and 1.9 g (0.022 mol) pyridine in 150 ml methylene chloride. The reaction mixture was then washed with water, dried over magnesium sulfate and evaporated to give a viscous oil. The oil was crystallized from ether to give the product, N-(N'-propargylcarbamylmethyl)-2-methyl-6-ethyl-alpha-chloroacetanilide, as a colorless solid, m.p. 83°–85° C. Elemental analysis for $C_{16}H_{19}ClN_2O_2$ showed: %Cl, calc. 11.6, found 12.0.

EXAMPLE 4

Preparation of N-(N',N'-dimethylcarbamylmethyl)-2,6-dimethyl-alpha-chloroacetanilide A slurry of methyl alpha-(N-2,6-dimethylphenylamino)thioacetate (4614 g, 22.1 mols) and 9.2 liters of a 40% aqueous solution of dimethylamine was stirred at about 25° C for 2 hours. The reaction mixture was then diluted with 3 liters of methylene dichloride. The organic layer was separated, washed with water, dried over magnesium sulfate and evaporated to give 3667 g (80.5% yield) of crude N-(N',N'-dimethylcarbamylmethyl)-2,6-dimethyl aniline. The crude product was crystallized from hexane to give 2449 g of product, m.p. 47°–49° C.

A sample of 919 g (11.6 mols) pyridine was added to a solution of 2178 g (10.6 mols) N-(N',N'-dimethylcarbamylmethyl)-2,6-dimethyl aniline and 1194 g (10.6 mols) chloroacetyl chloride in 11 liters of methylene dichloride at a temperature of 25° C. After the addition was completed, an additional 239 g of chloroacetyl chloride and 202 g pyridine were added to the reaction mixture. The reaction mixture was then successively washed with water, 5% aqueous sodium bicarbonate and water, dried over magnesium sulfate and evaporated to give the crude N-(N',N'-dimethylcarbamylmethyl)-2,6-dimethyl-alpha-chloroacetanilide product. The crude product was crystallized from isopropyl alcohol/hexane to give 1284 g (first crop, m.p. 85° C) and 663 g (second crop, m.p. 79° C) of product.

EXAMPLE 5

Preparation of isopropyl alpha-(N-chloroacetyl-N-2,6-dimethylphenylamino)thioacetate A solution of 4.3 g (0.038 mol) chloroacetyl chloride in 75 ml ethyl acetate was added dropwise to a stirred and cooled (ice bath) solution of 9 g (0.038 mol) isopropyl alpha-(N-2,6-dimethylphenylamino)thioacetate and 3 g (0.038 mol) pyridine in 150 ml ethyl acetate. After stirring at about 25° C for 1½ hours, an additional 1 g pyridine and 1.4 g chloroacetyl chloride were added. The reaction mixture was stirred another ½ hour at about 25° C. Thin-layer chromatography showed the absence of isopropyl alpha-(N-2,6-dimethylphenylamino)thioacetate in the reaction mixture. Water (100 ml) was added to the reaction mixture. The organic layer was separated, washed with 10% aqueous sodium bicarbonate solution, washed with water, dried over magnesium sulfate and evaporated under reduced pressure to give an oil which solidified on standing. Recrystallization of the solid from hexane gave 7.7 g of isopropyl alpha-(N-chloroacetyl-N-2,6-dimethylphenylamino)thioacetate, as a colorless solid, m.p. 92°–96° C. The elemental analysis on the product is tabulated in Table I, under Compound No. 5a.

The other compounds tabulated in Table I were prepared by a procedure similar to that of this example.

EXAMPLE 6

Preparation of N-(N'-methyl-N'-propargylcarbamylmethyl)-2,6-dimethyl-alpha-chloroacetanilide A solution of 543 g (2.6 mols) methyl alpha-(N-2,6-dimethylphenylamino)thioacetate, 179 g (2.6 mols) N-methylpropargylamine and 205 g pyridine was heated under reflux for 5 hours and then at 25° C for 16 hours. The reaction mixture was diluted with methylene chloride, washed with water, dried over magnesium sulfate and evaporated to give a solid residue. Crystallization from 50% hexane/isopropyl alcohol gave the N-(N'-methyl-N'-propargylcarbamylmethyl)-2,6-dimethylaniline product, m.p. 54°–55° C (63% yield).

The N-(N'-methyl-N-propargylcarbamylmethyl)-2,6-dimethylaniline was reacted with chloroacetyl chloride by a procedure similar to that of Example 4 to give N-(N'-methyl-N'-propargylcarbamylmethyl)-2,6-dimethyl-alpha-chloroacetanilide, as a colorless solid, m.p. 75° C.

The compounds of the present invention are herbicidal in both pre- and post-emergent applications. For pre-emergent control of undesirable vegetation, the herbicidal compounds will be applied in herbicidally effective amounts to be locus or growth medium of the vegetation, e.g., soil infested with seeds and/or seedlings of such vegetation. Such application will inhibit the growth of or kill the seeds, germinating seeds and seedlings. For post-emergent applications, the herbicidal compounds will be applied directly to the foliage and other plant parts. Generally, the herbicidal compounds of the invention are effective against grassy weeds as well as broadleaved weeds. Some may be selective with respect to the type of application and/or type of weed.

The herbicidal compounds of the present invention can be used alone as herbicides. However, it is generally desirable to apply the compounds in herbicidal compositions comprising one or more of the herbicidal compounds intimately admixed with a biologically inert carrier. The carrier may be a liquid diluent or a solid, e.g., in the form of dust powder or granules. In the herbicidal composition, the active herbicidal compounds can be from about 0.01 to 95% by weight of the entire composition.

Suitable liquid diluent carriers include water and organic solvents, e.g., hydrocarbons such as benzene, toluene, kerosene, diesel oil, fuel oil, and petroleum naphtha. Suitable solid carriers are natural clays such as kaolinite, atalpulgite and montmorillonite. In addition, talcs, pyrophillite, diatomaceous silica, synthetic fine silicas, calcium aluminosilicate and tricalcium phosphate are suitable carriers. Organic materials such as walnut-shell flour, cottonseed hulls, wheat flour, wood flour or redwood-bark flour may also be used as solid carriers.

The herbicidal composition will also usually contain a minor amount of a surface-active agent. Such surface agents are those commonly known as wetting agents, dispersing agents and emulsifying agents, and can be anionic, cationic or nonionic in character. The herbicidal compositions may also contain other pesticides, adjuvants, stabilizers, conditioners, fillers, and the like.

The amount of herbicidal compound or composition administered will vary with the particular plant part or plant growth medium which is to be contacted, the general location of application — i.e., sheltered areas such as greenhouses, as compared to exposed areas such as fields — as well as the desired type of control. Generally, for both pre- and post-emergent control, the herbicidal compounds of the invention are applied at rates of 0.2 to 60 kg/ha, and the preferred rate is in the range 0.5 to 40 kg/ha.

The thioate esters of the invention wherein Y is $-SR^4$ (Formula VI) are also useful for controlling fungi, particularly plant fungal infections caused by *Eotrytis cinerea,* leaf blights caused by organisms such as *Septcria apii, Alternaria solani conidia* and *Phytophthora infestans conidia,* powdery mildew caused by organismis such as *Erysiphe polygoni* and *E. chicoraciarum* and leaf rust caused by organisms such as *Uromyces phaseoli typica.* However, some fungicidal compounds of the invention may be more fungicidally active than others against particular fungi.

When used as fungicides, the thioate esters are applied in fungicidally effective amounts to fungi and/or their habitats, such as vegetative hosts and non-vegetative hosts, e.g., animal products. The amount used will, of course, depend on several factors such as the host, the type of fungus and the particular compound of the invention. As with most pesticidal compounds, the fungicides of the invention are not usually applied full strength, but are generally incorporated with conventional, biologically inert extenders or carriers normally employed for facilitating dispersion of active fungicidal compounds, recognizing that the formulation and mode of application may affect the activity of the fungicide. Thus, the fungicides of the invention may be formulated and applied as granules, as powdery dusts, as wettable powders, as emulsifiable concentrates, as solutions, or as any of several other known types of formulations, depending on the desired mode of application.

Wettable powders are in the form of finely divided particles which disperse readily in water or other dispersant. These compositions normally contain from about 5–80% fungicide, and the rest inert material, which includes dispersing agents, emulsifying agents and wetting agents. The powder may be applied to the soil as a dry dust, or preferably as a suspension in water. Typical carriers include fuller's earth, kaolin clays, silicas, and other highly absorbent, readily wettable, inorganic diluents. Typical wetting, dispersing or emulsifying agents include, for example: the aryl and alkylaryl sulfonates and their sodium salts; alkylamide sulfonates, including fatty methyl taurides; alkylaryl polyether alcohols, sulfated higher alcohols, and polyvinyl alcohols; polyethylene oxides, sulfonated animal and vegetable oils; sulfonated petroleum oils, fatty acid esters of polyhydric alcohols and the ethylene oxide addition products of such esters; and the addition products of long-chain mercaptans and ethylene oxide. Many other types of useful surface-active agents are available in commerce. The surface-active agent, when used, normally comprises from 1% to 15% by weight of the fungicidal composition.

Dusts are freely flowing admixtures of the active fungicide with finely divided solids such as talc, natural clays, kieselguhr, pyrophyllite, chalk, diatomaceous earths, calcium phosphates, calcium and magnesium carbonates, sulfur, lime, flours, and other organic and inorganic solids which act as dispersants and carriers for the toxicant. These finely divided solids have an average particle size of less than about 50 microns. A typical dust formulation useful herein contains 75% silica and 25% of the toxicant.

Useful liquid concentrates include the emulsifiable concentrates, which are homogeneous liquid or paste compositions which are readily dispersed in water or other dispersant, and may consist entirely of the fungicide with a liquid or solid emulsifying agent, or may also contain a liquid carrier such as xylene, heavy aromatic naphthas, isophorone, and other non-volatile organic solvents. For application, these concentrates are dispersed in water or other liquid carrier, and are normally applied as a spray to the area to be treated.

Other useful formulations for fungicidal applications include simple solutions of the active fungicide in a dispersant in which it is completely soluble at the desired concentration, such as acetone, alkylated naphthalenes, xylene, or other organic solvents. Granular formulations, wherein the fungicide is carried on relatively coarse particles, are of particular utility for aerial distribution or for penetration of cover-crop canopy. Pressurized sprays, typically aerosols wherein the active ingredient is dispersed in finely divided form as a result of vaporization of a low-boiling dispersant solvent carrier, such as the Freons, may also be used. All of those techniques for formulating and applying fungicides are well known in the art.

The percentages by weight of the fungicide may vary according to the manner in which the composition is to be applied and the particular type of formulation, but in general comprise 0.5 to 95% of the toxicant by weight of the fungicidal composition.

The fungicidal compositions may be formulated and applied with other active ingredients, including other fungicides, insecticides, nematocides, bactericides, plant growth regulators, fertilizers, etc.

EXAMPLE 7

Herbicidal Tests

Pre-emergent herbicidal tests with representative compounds of the invention were made using the following method:

An acetone solution of the test compound was prepared by mixing 750 mg of the compound, 220 mg of a nonionic surfactant and 25 ml of acetone. This solution was added to approximately 125 ml of water containing 156 mg of surfactant.

Seeds of the test vegetation were planted in a pot of soil and the test solution was sprayed uniformly onto the soil surface at a dose of 33 micrograms/$cm^2$. The pot was watered and placed in a greenhouse. The pot was watered intermittently and was observed for seedling emergence, health of emerging seedlings, etc., for a 3-week period. At the end of this period, the herbicidal effectiveness of the compound was rated based on the physiological observations. A 0-to-100 scale was used, 0 representing no phytotoxicity, 100 representing complete kill. The results of these tests appear in the last two columns of Table I and in Table II.

EXAMPLE 8

Tomato Late Blight

Compounds of the invention were tested for the control of the Tomato Late Blight organism *Phytophthora infestans conidia.* Five- to six-week old tomato (variety Bonny Best) seedlings were used. The tomato plants were sprayed with a 250-ppm solution of the test compound in acetone, water and a small amount of a nonionic emulsifier. The sprayed plants were then inoculated one day later with the organism, placed in an environmental chamber and incubated at 66°–68° F and 100% relative humidity for at least 16 hours. Following the incubation, the plants were allowed to dry and then were maintained at 60–80% relative humidity for approximately 7 days. The percent disease control provided by a given test compound was based on the percent disease reduction relative to untreated check plants. Representative compounds tabulated in Table I were tested, and Compound Nos. 5(*a*)–5(*b*), 5(*f*)–5(*h*) and 5(*j*)–5(*n*) were found to give 18 to 63% control.

EXAMPLE 9

Tomato Early Blight

Compounds of the invention were tested for the control of the Tomato Early Blight organism, *Alternaria solani conidia.* Tomato (variety Bonny Best) seedlings of 6 to 7 weeks old were used. The tomato plants were sprayed with a 250-ppm solution of the compound in an acetone-and-water solution containing a small amount of a non-ionic emulsifier. The sprayed plants were inoculated one day later with the organism, dried and maintained at 60–80% relative humidity for about 12 days. Percent disease control was based on the percent disease development on untreated check plants. The compounds tabulated in Table I were tested, and Compound Nos. 5(*a*)–5(*b*), 5(*d*)–5(*e*), 5(*i*)–5(*j*) and 5(*m*)–5(*t*) were found to give 21 to 88% control.

EXAMPLE 10

A series of reactions between various amines and (1) methyl alpha-(N-2,6-dimethylphenylamino)thioacetate or (2) methyl alpha-(N-2,6-dimethylphenylamine)acetate was conducted. Each reaction was conducted by reacting 0.02 mol of the acetate or thioacetate, 0.06 mol of the amine in 10–15 ml. of solvent at a temperature of 25° C. The extent of the reaction between the acetate or thioacetate and the amine to give the corresponding amide was determined by gas-liquid chromatography. The results are tabulated in Table III.

TABLE I

Compounds of the formula

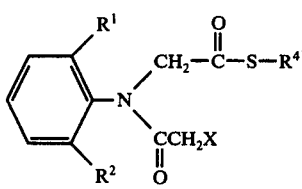

| No. | $R^1$ | $R^2$ | $R^4$ | X | Melting Point, °C. | Sulfur, wt.% Calc. | Sulfur, wt.% Found | Halogen, wt.% Calc. | Halogen, wt.% Found | Herbicidal Effectiveness Watergrass | Herbicidal Effectiveness Crabgrass |
|---|---|---|---|---|---|---|---|---|---|---|---|
| 5(a) | $CH_3$ | $CH_3$ | $i\text{-}C_3H_7$ | Cl | 92–96 | 10.2 | 10.1 | 11.3 | 11.6 | 100 | 90 |
| 5(b) | $C_2H_5$ | $C_2H_5$ | $i\text{-}C_3H_7$ | Cl | 79–83 | 9.4 | 9.3 | 10.4 | 10.3 | 100 | 80 |
| 5(c) | $C_2H_5$ | $CH_3$ | $C_2H_5$ | Cl | 82–83 | 10.7 | 10.8 | 11.8 | 12.0 | 100 | 93 |
| 5(d) | $CH_3$ | $CH_3$ | $CH_3$ | Cl | 93–96 | 11.9 | 11.4 | 13.2 | 14.2 | 100 | 100 |
| 5(e) | $CH_3$ | $CH_3$ | $C_2H_5$ | Br | 57–58 | 9.3 | 9.2 | 23.2 | 23.4 | 98 | 35 |
| 5(f) | $CH_3$ | $CH_3$ | $CH_3$ | Br | 94–96 | 10.2 | 9.8 | 25.4 | 25.0 | 98 | 65 |
| 5(g) | $C_2H_5$ | $C_2H_5$ | $C_2H_5$ | Cl | 58–60 | 9.8 | 9.9 | 10.8 | 12.0 | 100 | 100 |
| 5(h) | $C_2H_5$ | $C_2H_5$ | $C_2H_5$ | Br | 75–76 | 8.6 | 8.3 | 21.5 | 21.1 | — | 75 |
| 5(i) | $C_2H_5$ | $C_2H_5$ | $CH_3$ | Cl | 68–70 | 10.2 | 9.5 | 11.3 | 12.2 | 93 | 90 |
| 5(j) | $C_2H_5$ | $C_2H_5$ | $CH_3$ | Br | 74–75 | 9.0 | 8.3 | 22.3 | 23.7 | 98 | 35 |
| 5(k) | $CH_3$ | $CH_3$ | $t\text{-}C_4H_9$ | Cl | 100–102 | 9.8 | 9.7 | 10.8 | 11.1 |  |  |
| 5(l) | $C_2H_5$ | $C_2H_5$ | $t\text{-}C_4H_9$ | Cl | 122–123 | 9.0 | 9.0 | 10.0 | 9.8 |  |  |
| 5(m) | $CH_3$ | $CH_3$ | $t\text{-}C_4H_9$ | Br | 113–115 | 8.6 | 8.4 | 21.5 | 21.1 |  |  |
| 5(n) | $C_2H_5$ | $C_2H_5$ | $t\text{-}C_4H_9$ | Br | 129–130 | 8.0 | 8.1 | 20.0 | 21.5 |  |  |
| 5(o) | $CH_3$ | $CH_3$ | $CH_2\phi$ | Cl | 108–109 | 9.8 | 9.7 | 8.9 | 8.9 |  |  |
| 5(p) | $C_2H_5$ | $C_2H_5$ | $CH_2\phi$ | Cl | 71–72 | 8.2 | 8.2 | 9.1 | 9.0 |  |  |
| 5(q) | $CH_3$ | $CH_3$ | * | Cl | 74–75 | 8.1 | 8.0 | 17.9 | 18.4 |  |  |
| 5(r) | $C_2H_5$ | $C_2H_5$ | * | Cl | 61–62 | 7.6 | 7.9 | 16.7 | 18.9 |  |  |
| 5(s) | $i\text{-}C_3H_7$ | H | * | Cl | 97–98 | 7.8 | 7.8 | 17.3 | 17.3 |  |  |
| 5(t) | $i\text{-}C_3H_7$ | H | * | Br | 81–82 | 7.1 | 7.3 | 4.4 | 4.6 |  |  |
| 5(u) | $C_2H_5$ | $C_2H_5$ | ** | Cl | oil | 9.4 | 8.8 | 10.4 | 10.9 | 95 | 95 |
| 5(v) | $CH_3$ | $C_2H_5$ | $i\text{-}C_3H_7$ | Cl | 62–63 | 9.8 | 10.0 | 10.8 | 10.0 | 90 | 90 |

\*$CH_2\phi\text{-}p\text{-}Cl$
\*\*$CH_2CH\!=\!CH_2$
$\phi = phenyl$

TABLE II

| Example No. | Herbicidal Effectiveness O | W | C | M | P | L |
|---|---|---|---|---|---|---|
| 3 | 98 | 100 | 100 | 85 | 85 | 70 |
| 4 | 100 | 100 | 100 | 100 | 100 | 100 |
| 6 | 100 | 100 | 100 | 55 | 100 | 50 |

TABLE III

| Run No. | Ester | Amine | Solvent | Reaction Time | Conversion to Amide |
|---|---|---|---|---|---|
| 1a | acetate | $OH_3NH_2$ | $CH_3OH$ | 30 min. | 100% |
| 1b | thioacetate |  |  | 3 min. | 100% |
| 2a | acetate | $NH(CH_3)_2$ | $CH_3OH$ | 9 hours | 93.4% |
| 2b | thioacetate |  |  | 1 hour | 92.9% |
| 3a | acetate | $CH_3NHCH_2CH\!=\!CH_2$ | $CH_3OH$ | 26 hours | 1.2% |
| 3b | thioacetate |  |  | 6 hours | 91.7% |
| 4a | acetate | $NH_2CH_2CH\!=\!CH_2$ | $CH_3CN$ | 72 hours | 1% |
| 4b | thioacetate |  |  | 6 hours | 98% |
| 5a | acetate | $CH_3NHCH_2C\!\equiv\!CH$ | $CH_3CN$ | 24 hours | 0% |
| 5b | thioacetate |  |  | 24 hours | 93% |

What is claimed is:

1. A compound of the formula

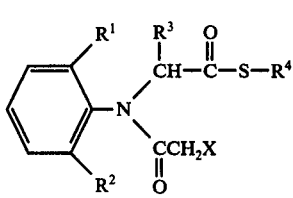

wherein $R^1$ is alkyl of 1 to 6 carbon atoms, $R^2$ is hydrogen or alkyl of 1 to 6 carbon atoms, $R^3$ is hydrogen or alkyl of 1 to 6 carbon atoms, $R^4$ is alkyl of 1 to 6 carbon atoms, alkenyl of 3 to 6 carbon atoms or phenylalkyl of 7 to 10 carbon atoms substituted on the phenyl ring with up to 2 fluoro, chloro, bromo or alkyl of 1 to 2 carbon atoms, and X is fluorine, chlorine, bromine or iodine.

2. The compound of claim 1 wherein $R^1$ and $R^2$ are alkyl of 1 to 3 carbon atoms, $R^3$ is hydrogen and $R^4$ is alkyl of 1 to 3 carbon atoms.

3. The compound of claim 1 wherein $R^1$ is methyl or ethyl, $R^2$ is methyl or ethyl and $R^4$ is methyl or ethyl.

4. The compound of claim 1 wherein X is chloro or bromo.

5. A compound of the formula

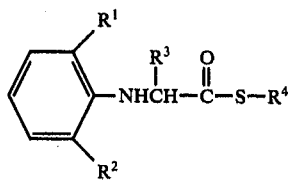

wherein $R^1$, $R^2$, $R^3$ and $R^4$ are as defined in claim 1.

6. The compound of claim 5 wherein $R^3$ is hydrogen and $R^4$ is alkyl of 1 to 4 carbon atoms.

7. The compound of claim 6 wherein $R^1$ and $R^2$ are alkyl of 1 to 3 carbon atoms.

* * * * *